(12) United States Patent
Stansfield et al.

(10) Patent No.: US 6,470,835 B1
(45) Date of Patent: Oct. 29, 2002

(54) PLATE-TYPE HEAT EXCHANGER FOR EXHAUST GAS HEAT RECOVERY

(75) Inventors: Tod A. Stansfield, Elm Grove, WI (US); Wilfred L. Ayala, Oak Creek, WI (US); Stephen R. Wilkinson, Grafton, WI (US); Brian W. Huibregtse, Menomonee Falls, WI (US); Todd L. Anderson, Menomonee Falls, WI (US); Hyunjae Park, Franklin, WI (US)

(73) Assignee: Aqua-Chem, Inc., Milwaukee, WI (US)

( * ) Notice: Subject to any disclaimer, the term of this patent is extended or adjusted under 35 U.S.C. 154(b) by 0 days.

(21) Appl. No.: 10/024,086

(22) Filed: Dec. 17, 2001

Related U.S. Application Data

(62) Division of application No. 09/594,448, filed on Jun. 15, 2000.

(51) Int. Cl.[7] .................................................. F22D 1/00
(52) U.S. Cl. ........................ 122/7 R; 122/31.1; 165/166
(58) Field of Search ............................... 122/7 R, 31.1; 165/166

(56) References Cited

U.S. PATENT DOCUMENTS

| | | | |
|---|---|---|---|
| 5,318,102 A | * | 6/1994 | Spokoyny et al. ............ 165/10 |
| 5,607,011 A | * | 3/1997 | Abdelmalek ........... 165/104.14 |
| 5,799,620 A | * | 9/1998 | Cleer et al. ................. 122/31.1 |

* cited by examiner

Primary Examiner—Jiping Lu
(74) Attorney, Agent, or Firm—Whyte Hirschboeck Dudek SC

(57) ABSTRACT

An exhaust gas heat recuperation system for use with a boiler is disclosed. The heat recuperation system includes a plate-type heat exchanger for exhaust gas heat recovery for exchanging heat between an exhaust gas and a charge gas. The heat exchanger preferably includes a series of exhaust gas plates stacked alternately with, and parallel to, a series of charge gas plates. Each of the exhaust gas plates and charge gas plates have raised contained ridges to form a substantially sinusoidal path for directing the respective gas therealong. The shape of the path reduces exhaust gas particulate deposition. The charge gas flows in a counter-current to the exhaust gas to facilitate maximum heat transfer. The heat exchange is particularly useful in laminar flow conditions. In one embodiment, the heat exchanger is connected to exhaust gas inlet and outlet conduits, change gas inlet and outlet conduits, and a condensate collection changer as part of an exhaust gas heat recuperation system, for use particularly in steam or hot water boiler applications. The heat exchanger can be used as a retrofit to existing boilers or integrated into a single unit as part of a new boiler construction.

30 Claims, 11 Drawing Sheets

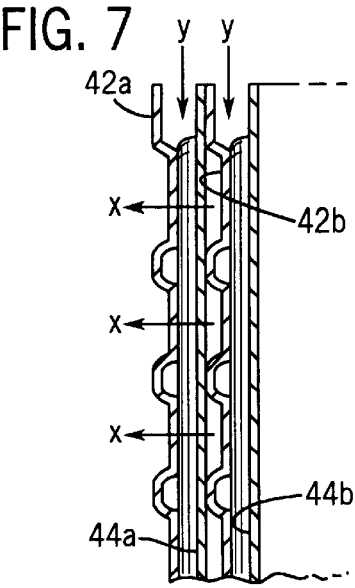
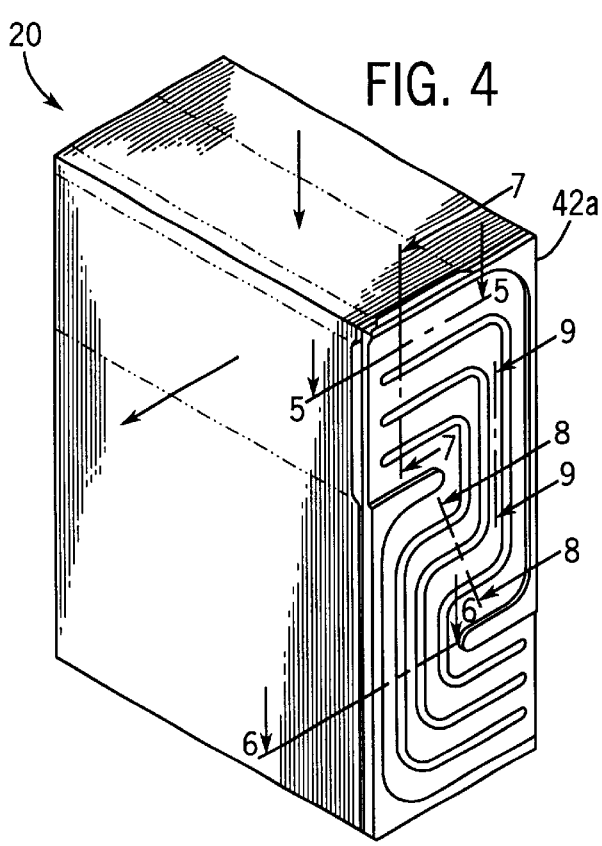
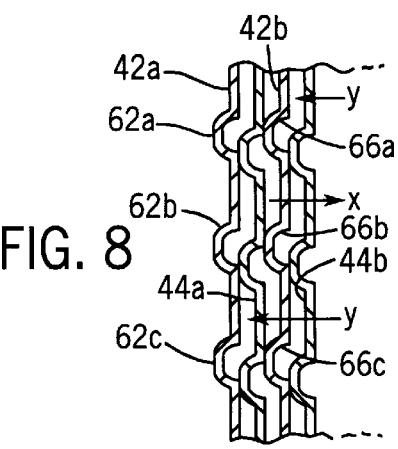
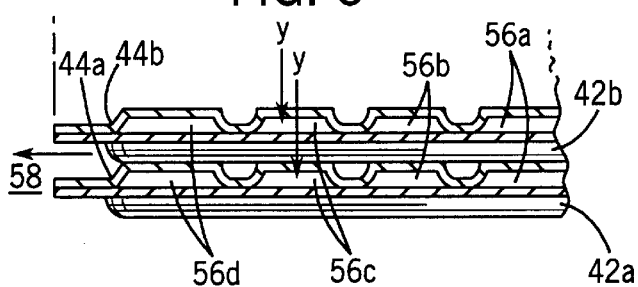
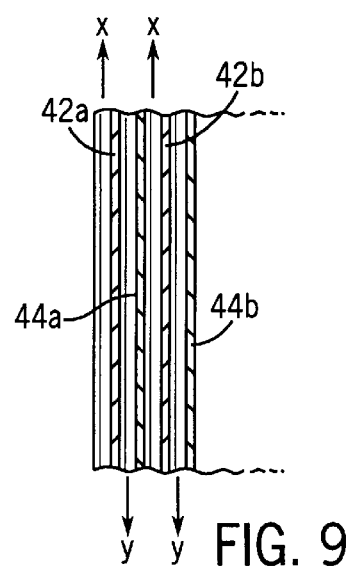
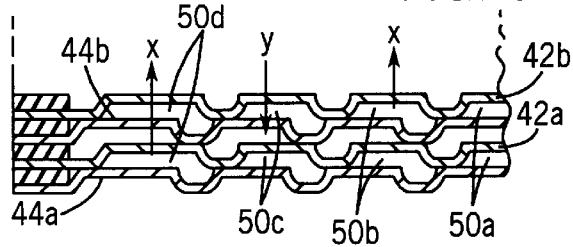

| Fuel Input | Firing Rate | O2 | Tgi | Tgo | Tai | Tao | Dp gas | Dp air | Tgo Cal | Tao Cal | Dp gas Cal | Dp air Cal | Ma(Calc) | Qmax | Qact | Eff |
|---|---|---|---|---|---|---|---|---|---|---|---|---|---|---|---|---|
| 650008 | 3.1 | | 324 | 122 | 82 | 303 | 0.82 | 1 | 107 | 311 | 1.09 | 1.04 | 592.2872896 | 34543.3793 | 31545.81333 | 0.91322314 |
| 850686 | 3 | | 345 | 119 | 72 | 309 | 1.3 | 1.3 | 108 | 322 | 1.6 | 1.51 | 775.1450832 | 50999.12046 | 44273.96172 | 0.868131868 |
| 1038717 | 3.1 | | 370 | 121 | 75 | 324 | 1.6 | 1.7 | 116 | 342 | 1.75 | 1.66 | 946.4789304 | 67289.91956 | 56797.25413 | 0.844067797 |
| 1298540 | 2.8 | | 397 | 124 | 75 | 338 | 2.1 | 2.2 | 128 | 359 | 2.19 | 2.07 | 1183.229648 | 91820.98714 | 74996.64478 | 0.816770186 |
| 1631507 | 2.9 | | 432 | 129 | 79 | 361 | 2.75 | 2.95 | 147 | 380 | 2.75 | 2.6 | 1486.629178 | 126472.0041 | 101034.2922 | 0.798866856 |

FIG. 23

| Fuel Input | Firing Rate O2 | Tgi | Tgo | Tai | Tao | Dp gas | Dp air | Tgo Cal | Tao Cal | Dp gas Cal | Dp air Cal | Ma(Calc) | Qmax | Qact | Eff |
|---|---|---|---|---|---|---|---|---|---|---|---|---|---|---|---|
| 658392 | 2.9 | 322 | 134 | 84 | 295 | 0.84 | 1.1 | 108 | 309 | 1.08 | 1.02 | 585.508 | 33583.57 | 29773.67 | 0.886555 |
| 840609 | 3 | 343 | 135 | 81 | 307 | 1.21 | 1.35 | 112 | 324 | 1.38 | 1.31 | 747.5536 | 47202.03 | 40716.25 | 0.862595 |
| 1080763 | 3 | 367 | 133 | 78 | 315 | 1.75 | 1.65 | 119 | 339 | 1.77 | 1.68 | 961.1225 | 66941.22 | 54896.44 | 0.820069 |
| 1351249 | 2.9 | 395 | 140 | 83 | 346 | 2.28 | 2.3 | 134 | 357 | 2.21 | 2.1 | 1201.666 | 90355.65 | 76165.18 | 0.842949 |
| 1682330 | 2.7 | 427 | 140 | 84 | 370 | 3.04 | 3.1 | 150 | 375 | 2.75 | 2.62 | 1496.096 | 123671.8 | 103119.9 | 0.833819 |

FIG. 24

PLATE-TYPE HEAT EXCHANGER FOR EXHAUST GAS HEAT RECOVERY

CROSS-REFERENCE TO RELATED APPLICATIONS

This application is a division of U.S. patent application Ser. No. 09/594,448, filed Jun. 15, 2000.

BACKGROUND OF THE INVENTION

The present invention relates generally to exhaust gas recuperation, and more particularly to plate-type gas-to-gas heat exchangers for exhaust gas heat recovery, particularly in boilers and other combustion processes.

A variety of heat exchangers and heat recovery systems, utilizing liquid-to-liquid and gas-to-gas heat transfer media, are known in the process of recuperation. In the gas-to-gas application, the process of recuperation uses the exhaust gases from combustion to heat a combustion or charge gas, thereby extracting heat that would normally be lost when releasing the exhaust gases, which significantly improves the overall thermal efficiency of the associated system.

Other prior plate-type heat exchangers utilizing gas as the heat transfer media often have limited operational flexibility, resulting in low throughput of the heat exchanging gases. There tends to be a decrease in thermal efficiency because of the co-current and cross-current gas flow designs, resulting in less heat transfer. Also, turbulent flow within the heat exchangers tend to result in higher pressure drops in the heat exchanger. Further, it is also found that the use of stacked plates, with the space between plates carrying the associated gases in a counter-current rather than in a co-current design, enables the heat exchanger to operate at a higher efficiency, and therefore more economically. Therefore, there exists a need for a plate-type gas-to-gas heat exchanger which is particularly suited for laminar flow that increases thermal efficiency with decreasing throughput.

Another problem associated with plate-type heat exchangers is that, in an effort to channel the exhaust gas across the plate, guiding structures are placed along the plate, oftentimes with sharp angular regions that are not conducive to the exhaust gas flow. Consequently, because the exhaust gas is a product of combustion and contains particulate and other undesirable matter, exhaust gas particulate deposits on the exhaust plate along these regions, causing particulate build-up, pressure loss for the exhaust gas, and potential fouling of the exhaust gas plate.

Another problem associated with gas-to-gas plate-type heat exchangers is that condensation is created because the exhaust gas, during the process of heat transfer, is cooled beyond the dew point for the exhaust gas. The orientation and plate design of other heat exchangers does not provide for the proper management of this condensate formed as a result of the cooling of the exhaust gas, and this results in undesirable pressure drops. Often, carbon dioxide needs to be neutralized from this condensate to prevent corrosion during the heat exchange process. Typical plate-type designs do not allow for convenient collection of condensate to facilitate neutralization or disposal.

Additionally, in expensive applications such as steam and hot water boiler systems, it is desirable to be able to introduce a heat exchanger that can be utilized with existing products, if desired, rather than replacing the entire system if heat recuperation is desired. Therefore, a need exists for retrofit-type heat exchanger that can be added on with currently installed devices, as well as integrated into new device construction, if appropriate.

Therefore, it would be desirable to have a heat recuperation system that solves the aforementioned problems.

SUMMARY OF THE INVENTION

The present invention provides a plate-type heat exchanger for exhaust gas heat recovery that overcomes the aforementioned problems.

In accordance with one aspect of the invention, an exhaust gas heat recuperation system for use with a boiler is provided. The system includes a heat exchanger for exchanging heat from an exhaust gas to a charge gas. An exhaust gas inlet conduit connected to the heat exchanger is used for conducting the exhaust gas from the boiler to the heat exchanger, and an exhaust gas outlet conduit connected to the heat exchanger is used for conducting the exhaust gas from the heat exchanger to a suitable vent to atmosphere. Similarly, a charge gas inlet conduit is connected to the heat exchanger for conducting the charge gas to the heat exchanger, and a charge gas outlet conduit is connected to the heat exchanger for conducting the charge gas away from the heat exchanger. A boiler connected to the charge gas outlet conduit receives the charge gas when the charge gas exits the heat exchanger to assist boiler combustion.

In accordance with another aspect of the invention, an integral boiler and exhaust gas heat recuperation system is contemplated wherein the heat exchanger is connected directly to the boiler to form an integral unit, and further includes a condensate collection chamber connected to the heat exchanger for collecting condensation formed as a result of cooling the exhaust gas.

In accordance with another aspect of the invention, a gas-to-gas heat exchanger for exchanging heat between an exhaust gas and a charge gas is provided. The heat exchanger includes a plurality of exhaust gas plates, and each exhaust gas plate has a plurality of raised contoured ridges. The contoured ridges form a substantially sinusoidal path along each exhaust gas plate and define multiple substantially sinusoidal exhaust gas channels. The exhaust gas channels direct the exhaust gas therealong. The heat exchanger further includes a plurality of charge gas plates which are stacked alternately with and parallel to the exhaust gas plates. Each charge gas plate has a plurality of raised contoured ridges. These contoured ridges form a substantially sinusoidal path along each charge gas plate and define multiple substantially sinusoidal charge gas channels. The charge gas panels direct the charge gas therealong. The exhaust gas plates and the charge gas plates are connected together to permit exhaust gas entering the exhaust gas contoured channels to flow parallel to and in a substantially opposite direction to the charge gas flowing in the charge gas contour channels. The arrangement facilitates heat transfer from the exhaust gas to the charge gas.

Various other features, objects and advantages of the present invention will be made apparent from the following detailed description and the drawings.

BRIEF DESCRIPTION OF THE DRAWINGS

The drawings illustrate the preferred modes presently contemplated for carrying out the invention.

In the drawings:

FIG. 4 is a perspective view of the heat exchanger in accordance with one aspect of the present invention.

FIG. 5 is a partial top sectional view of the heat exchanger taken along line 5—5 of FIG. 4.

FIG. 6 is a partial top sectional view of the heat exchanger taken along line 6—6 of FIG. 4.

FIG. 7 is a partial side sectional view of the heat exchanger taken along line 7—7 of FIG. 4.

FIG. 8 is a partial side sectional view of the heat exchanger taken along line 8—8 of FIG. 4.

FIG. 9 is a partial side sectional view of the heat exchanger taken along line 9—9 of FIG. 4.

FIG. 23 is a chart of the experimental data points and efficiency calculations of the data in FIG. 21.

FIG. 24 is a chart of the experimental data points and efficiency calculations of the data in FIG. 22.

DETAILED DESCRIPTION OF THE PREFERRED EMBODIMENT

Figure 1:
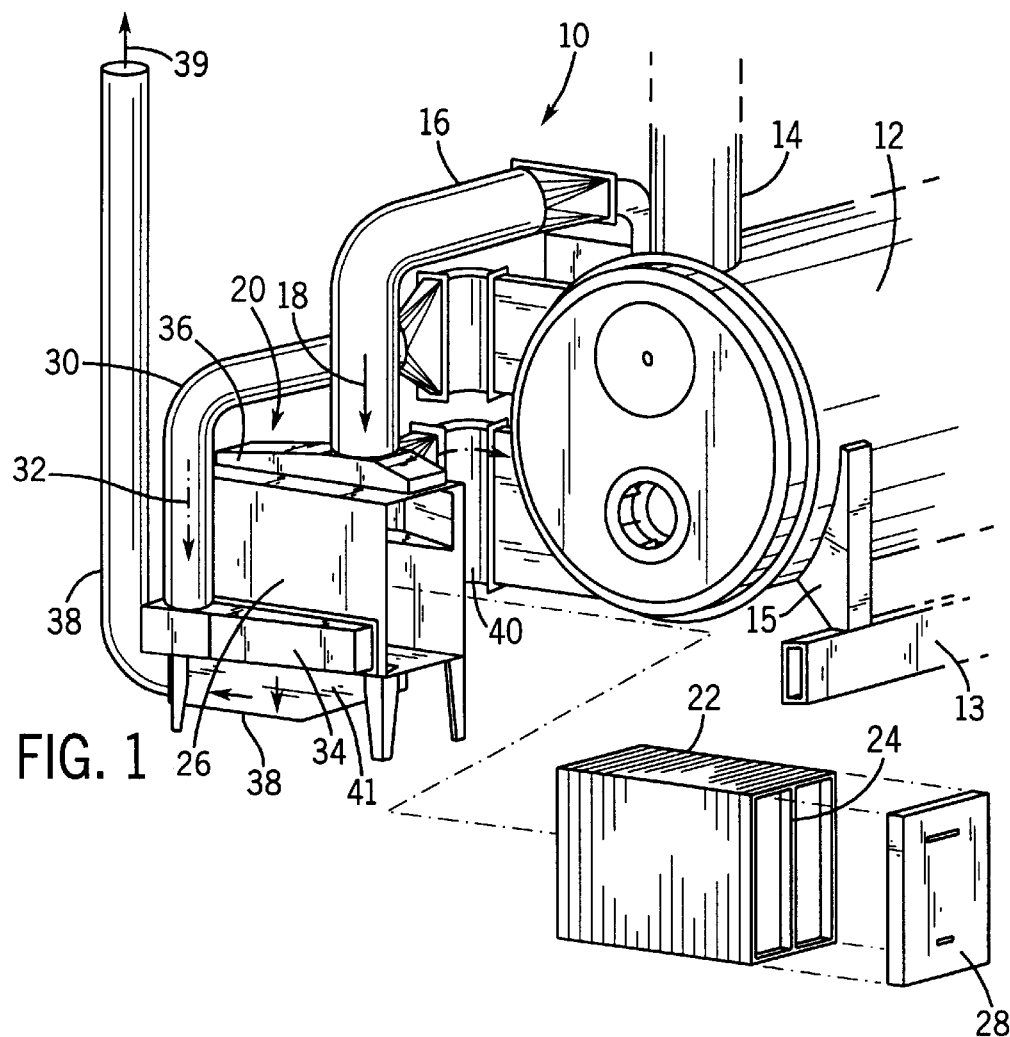
FIG. 1 is a partially exploded perspective view of an exhaust gas heat recuperation system in accordance with one aspect of the present invention.

Referring to FIG. 1, an exhaust gas beat recuperation system is shown generally by the numeral 10. The exhaust gas beat recuperation system 10 is shown and preferred as being used with a boiler 12. However, it is contemplated by the present invention that the exhaust gas heat recuperation system 10 may be utilized with any suitable combustion process including water beaters, drying ovens or heat treating systems. In the embodiment shown, the exhaust gas heat recuperation system 10 is a retrofit to the boiler 12, which may be a steam or hot water boiler, and is preferably utilized with boilers rated from 10 to 2,000 horsepower or firing rates of 400,000 to 80,000,000 BTU/hr. The system 10 uses the process of recuperation, where a relatively cool gas, preferably ambient air, is used to cool the exhaust gases from the combustion process (such as in a boiler), thereby extracting heat that would normally be lost from the system. This significantly improves the overall efficiency of the associated combustion process. After absorption of heat from the exhaust gases, the heated ambient air is introduced into the combustion process of the boiler 12, therefore reducing the amount of additional energy required to maintain the combustion process. As a result of the combustion process in the boiler 12, heated exhaust gas is created. This exhaust gas is eliminated by a flue 14. Typically, the heat from the exhaust gas would be lost. However, a portion (up to 100%) of the exhaust gas is drawn or forced through an exhaust gas inlet conduit 16, which may be constructed of any suitable duct work material for the range of temperatures or chemical constituents of the exhaust gas in the combustion process. The exhaust gas inlet conduit 16 directs the exhaust gas in a direction indicated by arrow 18 into heat exchanger 20. Preferably, the heat exchanger 20 is of a plate and frame style. The heat exchanger 20 includes a stacked plate section 22 within a frame 24. In this embodiment, the stacked plate section 22 and frame 24 are inserted into heat exchanger enclosure 26 and enclosed with heat exchanger cover 28. It is preferred that the heat exchanger cover 28 preferably provide an air tight seal in order to minimize any gas pressure losses within the heat exchanger. In a known manner, boiler 12 is connected to a pair of base beams 13 by a plurality of support members 15 connecting the boiler 12 to the base beams 13.

A cooling gas, or charge gas, that will be used ultimately as preheated air for the boiler 12 in the combustion process, enters the heat exchanger 20 by way of charge gas inlet conduit 30. Although the charge gas may be drawn from any air supply in which the temperature is less than that of the exhaust gas, it is preferred that ambient air be used, as a practical and economical approach for providing relatively low temperature charge gas. The charge gas conduit 30 directs the charge gas in a direction indicated by arrow 32 into the heat exchanger 20. In the embodiment shown, the charge gas will be introduced to the heat exchanger 20 at the bottom portion 34 of the heat exchanger 20 and the exhaust gas will be introduced at the top portion 36 of the heat exchanger 20. As will be further discussed in the discussion of FIGS. 2–3, the exhaust gas and the charge gas flow in parallel but opposite directions through the heat exchanger 20 to effect the heat transfer from the exhaust gas to the charge gas. There is no direct contact between the exhaust gas and the charge gas during the heat transfer. However, it is possible to have perforations or slots within the plates to allow for mixing of flue gas and combustion air, with the result of reduced $NO_x$ emissions. Following the heat transfer, the now cooled exhaust gas leaves the heat exchanger 20 through an exhaust gas outlet conduit 38, after which the exhaust gas is then released as indicated by arrow 39. The charge gas, now heated as a result of the heat transfer from the exhaust gas, exits the heat exchanger 20 via charge gas outlet conduit 40. The charge gas is then introduced into the boiler 12 as preheated air for the boiler combustion process in a conventional manner. A condensate collection chamber 41 is connected to the heat exchanger 20, preferably at the bottom, to collect condensation formed as a result of cooling the exhaust gas. The condensate collection chamber 41 then draws the water away in any suitable manner.

Figure 2:
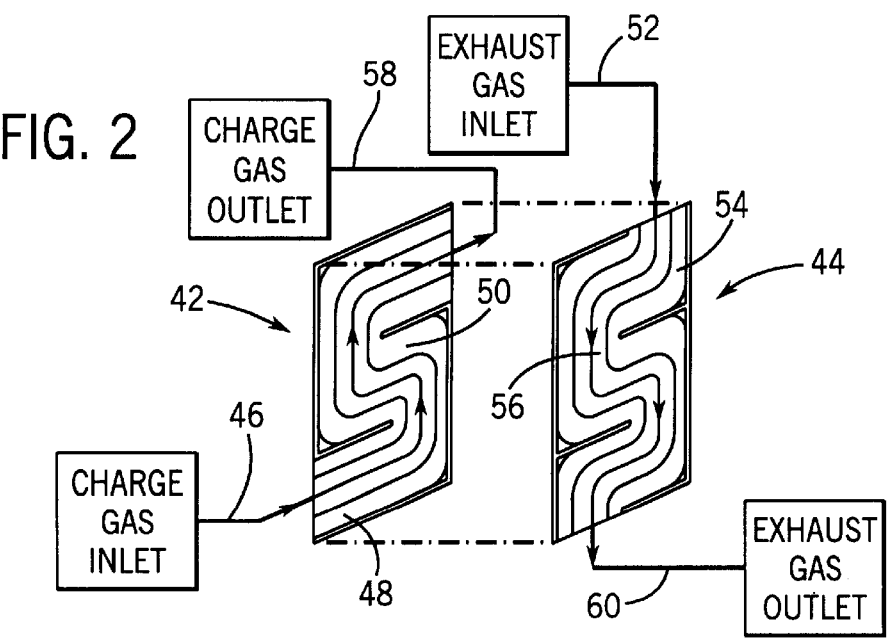
FIG. 2 is a schematic representation of the relative charge gas and exhaust gas flows of the exhaust gas plates and the charge gas plates in accordance with the present invention.

Referring now to FIG. 2, a schematic is shown illustrating the relative gas paths in a representative charge gas plate 42 and exhaust gas plate 44 within heat exchanger 20 (of FIG. 1). During the exhaust gas heat recuperation process, the charge gas enters the charge gas plate, preferably at charge gas entrance 46, although the charge gas may enter at other points along the charge gas plate 42. The charge gas flows along a charge gas plate surface 48 along substantially sinusoidal charge gas channels 50. In a similar manner, the exhaust gas enters exhaust gas plate 44 at an exhaust gas entrance 52. The exhaust gas is directed by exhaust gas channels 56 and flows in a substantially sinusoidal path along exhaust gas plate surface 54 on an adjacent side of the charge gas plate 42. The exhaust gas is traveling in a parallel but opposing flow from that of the charge gas in order to increase the maximum heat transfer, in laminar flow conditions. The heat from the exhaust gas is transferred across the exhaust gas plate 44 and absorbed by the charge gas flowing on the opposite side of the exhaust gas plate 44 in a direction counter to the exhaust gas. When the charge gas emerges from the charge gas outlet 58, it is ready to be introduced into the combustion process. When the exhaust gas emerges from the exhaust gas outlet 60, the now cooler exhaust gas is drawn away and disposed of as appropriate.

Figure 3:
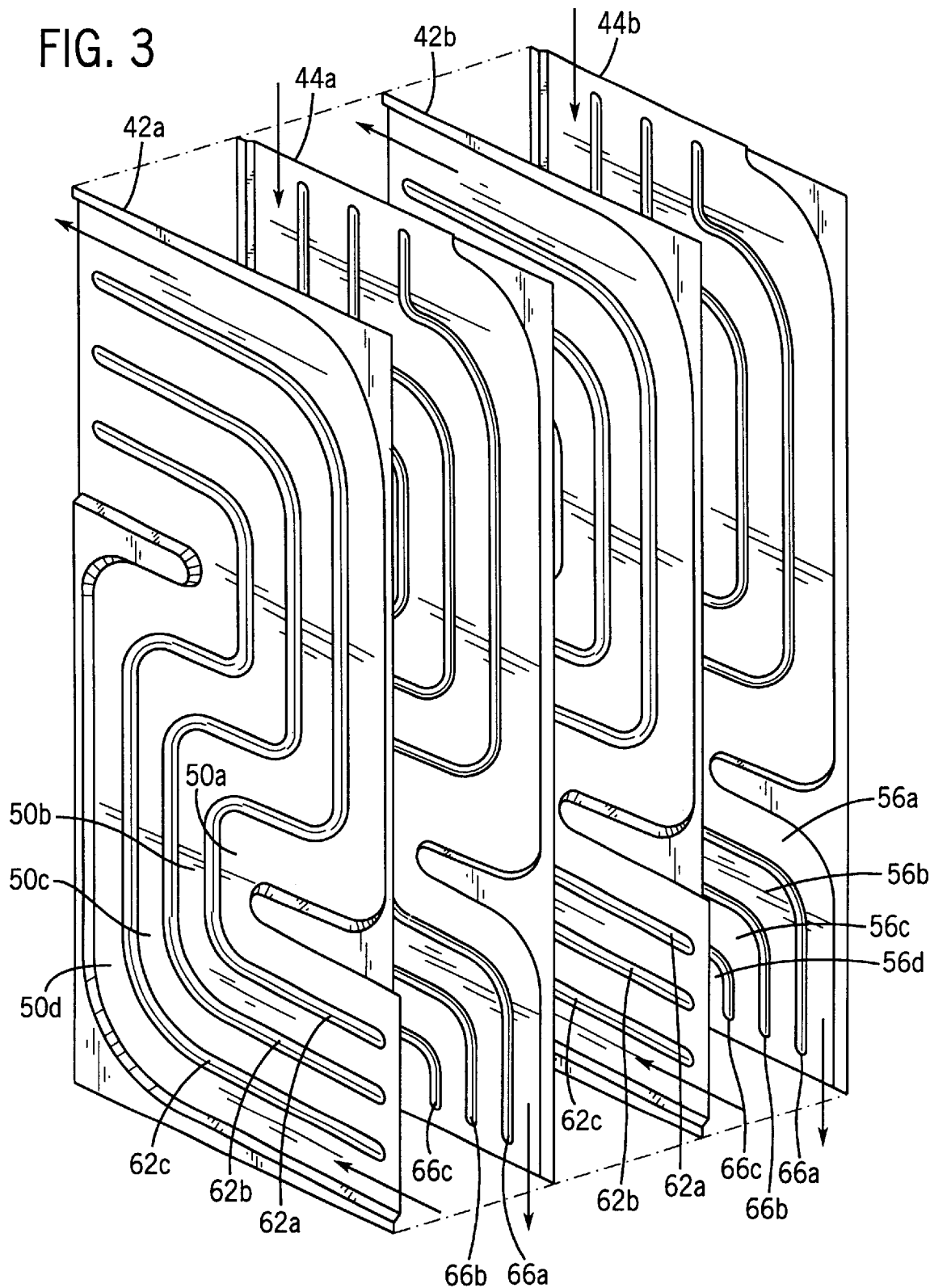
FIG. 3 is a perspective view of an alternating arrangement of the exhaust gas plates and the charge gas plates as part of the heat exchanger of the present invention.

Referring now to FIG. 3, an embodiment of one arrangement of the charge gas plates 42a–b and exhaust gas plates 44a–b is shown. Although four total plates are shown, it is contemplated that numerous plates are arranged in a similar alternating stack configuration as shown in FIG. 3 (charge gas plate, then exhaust gas plate, or vice versa). It also does not matter which plate (either charge gas plate or exhaust gas plate) is outermost within the heat exchanger 20. The spaces shown between each charge gas plate 42a–b and each exhaust gas plate 44a–b are exaggerated for demonstration purposes, but it is preferred that the spacing between plates is in a range of 0.030 to 0.300 inches, although any spacing is contemplated that provides adequate gas flow across each of the plates. Additionally, the charge gas plates 42a–b and exhaust gas plates 44a–b may be secured together by any suitable means. However, although not specifically shown, it is contemplated that the plates may be secured together by a rod extending through each of the plates, and such a rod or other connecting element may be part of the frame structure 24 (of FIG. 1). Each of the exhaust gas plates 42a–b includes raised contoured ridges or ribs 62a–c, substantially parallel to one another and preferably spaced 1.5 to 5 inches apart. The raised contoured ridges 62a–c wind in a substantially sinusoidal fashion along the charge gas plate 42a. It is preferred that the raised contoured ridges do not contain any sharp angular regions with a bend radius so as not to create low flow zones along the contoured sinusoidal path. The substantially sinusoidal path contributes to a reduction in the pressure loss along the charge gas plate. Preferably, the raised contoured ridges 62a–c are evenly spaced along the face of the charge gas plate 42a–b. The raised contoured ridges 62a–c define multiple charge gas channels 50a–d. The charge gas channels 50a–d are substantially sinusoidal in the preferred embodiment. The shape of the charge gas channels 50a–d are determined by the shape of the raised contoured ridges 62a–c.

Similarly, each of the exhaust plates 44a–b include raised contoured ridges 66a–c. The raised contoured ridges 66a–c are also substantially sinusoidal in order to reduce the pressure drop in the flow of the exhaust gas. It is particularly important in the exhaust gas plates 44a–b to have substantially sinusoidal raised contoured ridges 66a–c (and therefore substantially sinusoidal contoured exhaust gas channels 56a–d) such that the exhaust gas flowing along the exhaust gas plates does not encounter sharp cornered regions where it is likely that the exhaust gas, which contains some particulate, would deposit that particulate on the surface of the exhaust plate. Such particulate deposition results in fouling and increased pressure loss of the exhaust gas, and therefore decreases the mechanical and thermal efficiency of the heat exchanger.

The gases follow the directions indicated by their respective arrows. Exhaust gas plates 42a–b and exhaust gas plates 44a–b are preferably constructed of stainless steel or any other suitable material having good thermal transfer characteristics and corrosion resistance.

Referring now to FIG. 4, an enlarged view of the heat exchanger 20 is shown with the charge gas plates and the exhaust gas plates inserted. In operation, the plates are oriented in a vertical position. Preferably, the plates are substantially of the same size and shape. The heat exchanger 20 is shown with charge gas plate 42a as the end plate. However, an exhaust gas plate may also terminate the heat exchanger 20. The charge gas plates are stacked alternately with and parallel to the exhaust gas plates.

FIGS. 5–9 indicate an example of relative gas flow positions with respect to discrete positions within the substantially sinusoidal paths of the charge gas plates and the exhaust gas plates. The figures indicate that for a substantial portion of the time that the charge gas is traveling along the charge gas channels, and the exhaust gas is traveling along the exhaust gas channels, the charge gas and the exhaust gas are traveling parallel to but in completely opposite directions in order to maximize heat transfer from the exhaust gas to the charge gas.

Referring now to FIG. 5, which is taken along line 5—5 of FIG. 4, an example of a contemplated embodiment of the present invention is illustrated. As earlier indicated, the charge gas plates 42a–b alternate with the exhaust gas plates 44a–b. In operation, the exhaust gas enters the heat exchanger and travels along direction Y in each channel of the respective exhaust gas plate 44a–b. FIG. 5 is a representative illustration, and more plates are similarly stacked to yield an arrangement with a larger number of plates. Because of the orientation of the plates, the exhaust gas is allowed to proceed only through the exhaust gas channels 56a–d so as not to interfere with the charge gas exiting charge gas-outlet 58.

Referring now to FIG. 6, taken along line 6—6 of FIG. 4, the charge gas plates 42a–b are alternately stacked with exhaust gas plates 44a–b. At this location in the heat exchanger, and by way of example, the charge gas is running along the charge gas channels in a direction indicated by the arrow X (in this case, coming out of the page) and the exhaust gas is traveling through the exhaust gas channels in a direction indicated by arrow Y (in this case, down into the page). At this point, the gases are traveling parallel to but in completely opposite directions from one another. This opposing flow maximizes heat transfer from the exhaust gas to the charge gas.

Referring now to FIG. 7, taken along line 7—7 of FIG. 4, the charge gas is shown flowing along charge gas plates 42a–b in a charge gas direction indicated by arrow X and the exhaust gas is shown flowing along exhaust gas plates 44a–b in a direction indicated by arrow Y.

Referring now to FIG. 8, taken along line 8—8 of FIG. 4, what is shown is the relative exhaust gas flow direction Y in an opposite direction with respect to charge gas flow X. The raised contoured ridges 62a–c of charge gas plate 42a are similar in size and shape to the raised contoured ridges 66a–c of charge gas plate 42b. The raised contoured ridges are preferably of a semicircular shape. However any suitable shape is contemplated such that the plates can be stacked together with perimeter gaskets to form an air-tight seal.

Referring now to FIG. 9, what is shown are the opposite traveling directions of the charge gas along the charge gas direction X along the charge gas plates 42a–b and the exhaust gas along exhaust gas direction Y along exhaust gas plates 44a–b.

Figure 10:
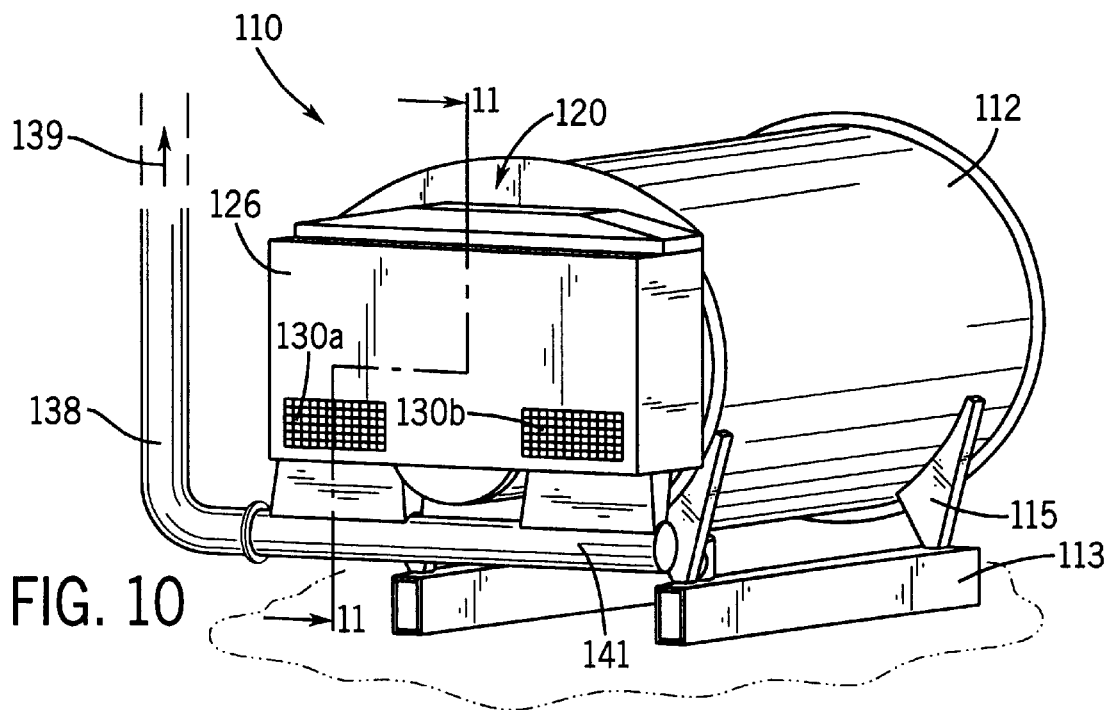
FIG. 10 is a perspective view of a second embodiment of a heat recuperation system in accordance with the present invention.

Referring now to FIG. 10, a second embodiment of the present invention is shown generally by the numeral 110. In this embodiment of the exhaust gas heat recuperation system 110, the heat exchanger 120 is integral with boiler 112. In this manner, as opposed to providing the heat recuperation system as an after-market or post-installation addition, the heat exchanger 120 is built into or contained within the boiler 112 so as to eliminate much of the ductwork and outer conduits associated with the retrofit embodiment of FIG. 1. The boiler 112 is connected to a pair of base beams 113 by a plurality of support members 115 connecting the boiler 112 to the base beams 113. Preferably, ambient air that is used as a relatively low temperature charge gas is drawn or pumped into the heat exchanger 120 through charge gas inlet 130a–b, although any suitable intake is contemplated that provides the ambient air or other charge gas. Once the exhaust gas has passed through the heat exchanger, and been cooled by the charge gas, it is exhausted via exhaust gas outlet conduit 138 in a direction indicated by arrow 139 and disposed of in a suitable fashion. A condensate collection chamber 141 is connected to the heat exchanger 120, preferably at the bottom, to collect condensation formed as a result of cooling the exhaust gas. The condensate collection chamber 141 then draws the water away in any suitable manner.

Figure 11:
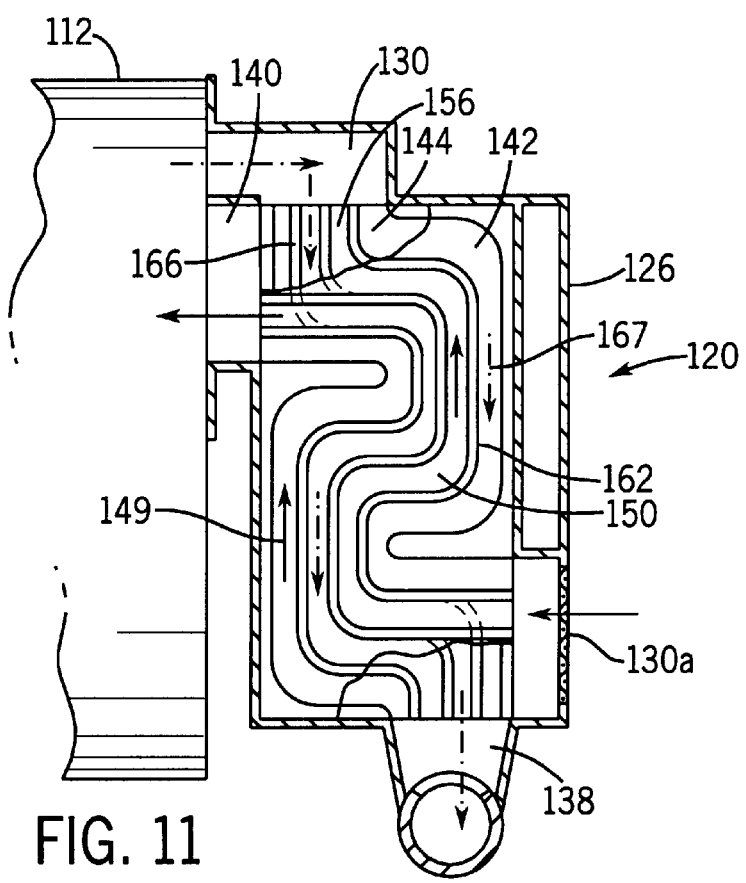
FIG. 11 is a partial side sectional view of the heat exchanger integral with the boiler taken along line 11—11 of FIG. 10.

Referring now to FIG. 11, the heat exchanger 120 is shown attached to the boiler 112 such that the heat exchanger enclosure 126 is connected directly to the boiler 112. In operation, the charge gas or ambient air enters charge gas inlet 130a and travels along charge gas channels 150 in a direction indicated by arrow 149, and enters the boiler 112 through the charge gas outlet conduit 140, which leads in a conventional manner to the burner (not shown) of the boiler 112.

In a similar manner, the exhaust gas enters the exhaust gas plate 144 through exhaust gas inlet conduit 130 and travels along exhaust gas channels 156 (that are bounded by exhaust gas raised contoured ridges 166) in a direction indicated by arrow 167 such that the exhaust gas flows parallel to and in a substantially opposite direction to the charge gas to facilitate heat transfer from the exhaust gas to the charge gas. The exhaust gas then travels through exhaust gas outlet conduit 138, and the now cooler exhaust gas is disposed of as appropriate.

Figure 12:
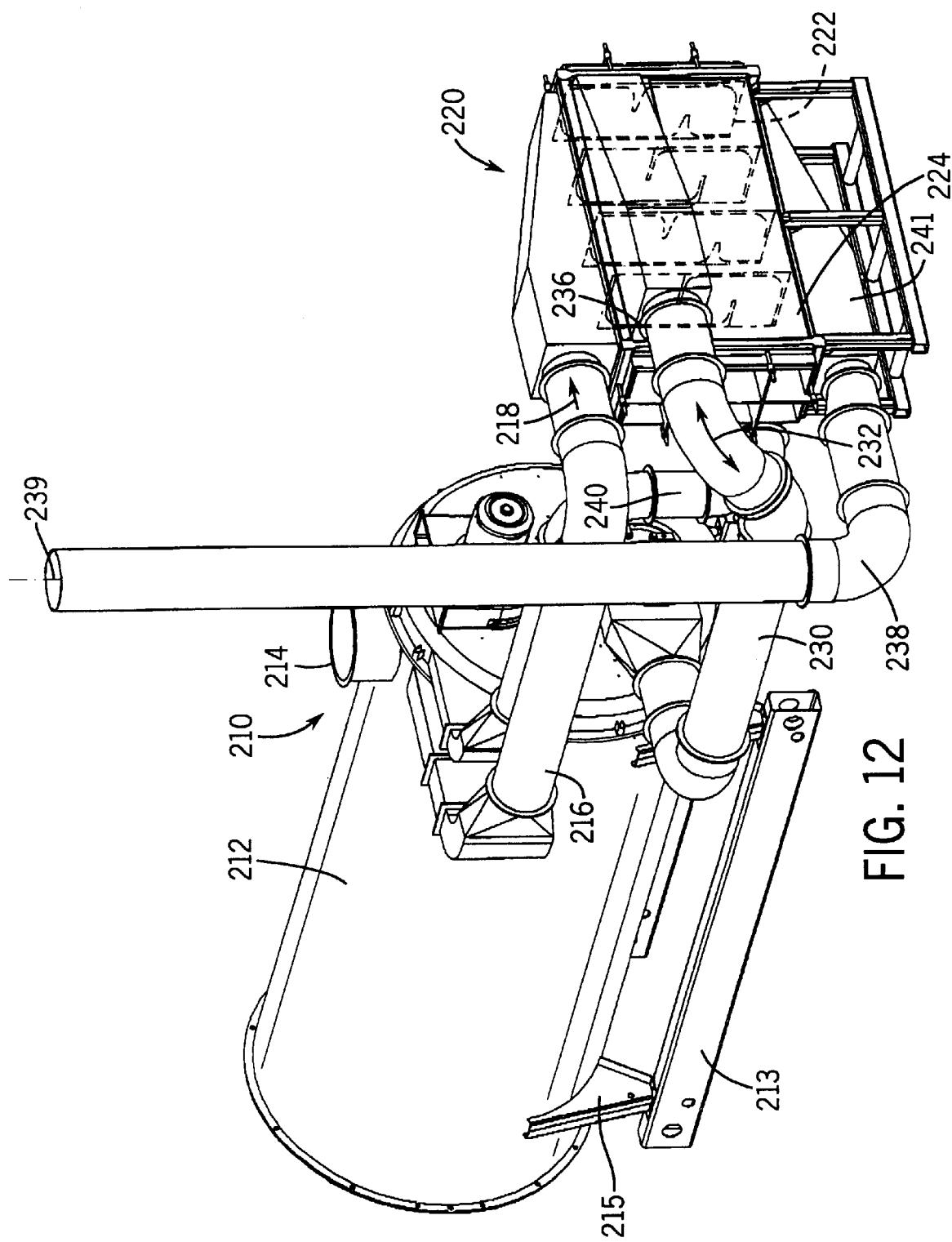
FIG. 12 is a perspective view of a third embodiment of a heat recuperation system in accordance with the present invention.

Referring to FIG. 12, the exhaust gas heat recuperation system is shown generally by the numeral 210. The exhaust gas heat recuperation system 210 is shown and preferred as being used with a boiler 212. However, it is contemplated by the present invention that the exhaust gas heat recuperation system 210 may be utilized with any suitable combustion process including water heaters, drying ovens or heat treating systems. In the embodiment shown, the exhaust gas heat recuperation system 210 is a retrofit to the boiler 212, which may be a steam or hot water boiler, and is preferably utilized with boilers rated from 210 to 2,000 horsepower or firing rates of 400,000 to 80,000,000 BTU/hr. The system 210 uses the process of recuperation, where a relatively cool gas, preferably ambient air, is used to cool the exhaust gases from the combustion process (such as in a boiler), thereby extracting heat that would normally be lost from the system. This significantly improves the overall efficiency of the associated combustion process. After absorption of heat from the exhaust gases, the heated ambient air is introduced into the combustion process of the boiler 212, therefore reducing the amount of additional energy required to maintain the combustion process. As a result of the combustion process in the boiler 212, heated exhaust gas is created. This exhaust gas is eliminated by a flue 214. Typically, the heat from the exhaust gas would be lost. However, a portion (up to 100%) of the exhaust gas is drawn or forced through an exhaust gas inlet conduit 216, which may be constructed of any suitable duct work material for the range of temperatures or chemical constituents of the exhaust gas in the combustion process. The exhaust gas inlet conduit 216 directs the exhaust gas in a direction indicated by arrow 218 into heat exchanger 220. Preferably, the heat exchanger 220 is of a plate and frame style. The heat exchanger 220 includes a stacked plate section 222 within a frame 224. In a known manner, boiler 212 is connected to a pair of base beams 213 by a plurality of support members 215 connecting the boiler 212 to the base beams 213.

A cooling gas, or charge gas, that will be used ultimately as preheated air for the boiler 212 in the combustion process, enters the heat exchanger 220 by way of charge gas inlet conduit 230. Although the charge gas may be drawn from any air supply in which the temperature is less than that of the exhaust gas, it is preferred that ambient air be used, as a practical and economical approach for providing relatively low temperature charge gas. The charge gas conduit 230 directs the charge gas in a direction indicated by arrow 232 into the heat exchanger 220. In the embodiment shown, the charge gas will be introduced to the heat exchanger 220 at the location 234 of the heat exchanger 220 and the exhaust gas will be introduced at the location 236 of the heat exchanger 220. However, it is contemplated that other entry points are possible. The exhaust gas and the charge gas flow in parallel but opposite directions through the heat exchanger 220 to effect the heat transfer from the exhaust gas to the charge gas. There is no direct contact between the exhaust. gas and the charge gas during the heat transfer. Following the heat transfer, the now cooled exhaust gas leaves the heat exchanger 220 through an exhaust gas outlet conduit 238, after which the exhaust gas is then released as indicated by arrow 239. The charge gas, now heated as a result of the heat transfer from the exhaust gas, exits the heat exchanger 220 via charge gas outlet conduit 240. The charge gas is then introduced into the boiler 212 as preheated air for the boiler combustion process in a conventional manner. A condensate collection chamber 241 is connected to the heat exchanger 220, preferably at the bottom, to collect condensation formed as a result of cooling the exhaust gas. The condensate collection chamber 241 then draws the water away in any suitable manner.

Figure 13:
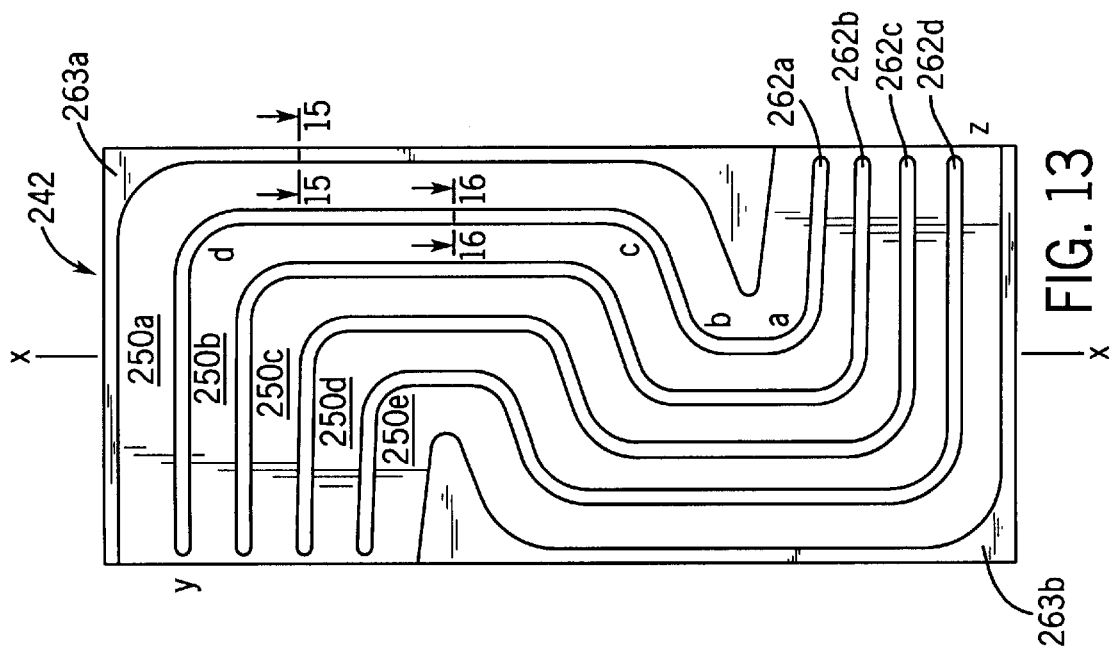
FIG. 13 is a front view of a charge gas plate in accordance with the third embodiment of the invention.

Referring now to FIG. 13, a charge gas plate 242 of the third embodiment is shown. As in the other embodiments, the exhaust gas plate 242 includes raised contoured ridges or ribs 262a–d, which are substantially parallel to one another and preferably spaced 1.5 to 5 inches apart. The raised contoured ridges 262a–d are aligned in a substantially sinusoidal fashion along the charge gas plate 242. It is preferred that the raised contoured ridges do not contain any sharp angular regions so as not to create low-flow zones along the contoured sinusoidal path. For example, along raised contoured ridge 262a, locations a, b, c and d define a specific radius of curvature. It is preferred that this radius of curvature is a minimum of 1.5 inches. This preferred radius of curvature is similar for the other raised contoured ridges 262b–d. The substantially sinusoidal path, combined with an appropriate radius of curvature, contributes to a reduction in the pressure loss along the charge gas plate. Preferably, the raised contoured ridges 262a–d are evenly spaced along the face of the charge plate 242. The raised contoured ridges 262a–d also define multiple charge gas channels 250a–e. Likewise, these charge gas channels are also substantially sinusoidal. The charge gas plate 242 also includes perimeter contoured ridges 263a and b which bound the charge gas plate 242.

As earlier indicated, the raised contoured ridges 262a–d are substantially parallel to one another and spaced approximately 1.5 to 5 inches apart from one another in a preferred embodiment. The raised contoured ridges 262a–d provide structural support for the charge gas plate 242. The exhaust gas plate 242 defines an exhaust plate mid-line X. The charge gas channels 250a–e terminate on generally diagonal opposing ends Y and Z of the charge gas plate 242 with respect to the mid-line X.

Figure 14:
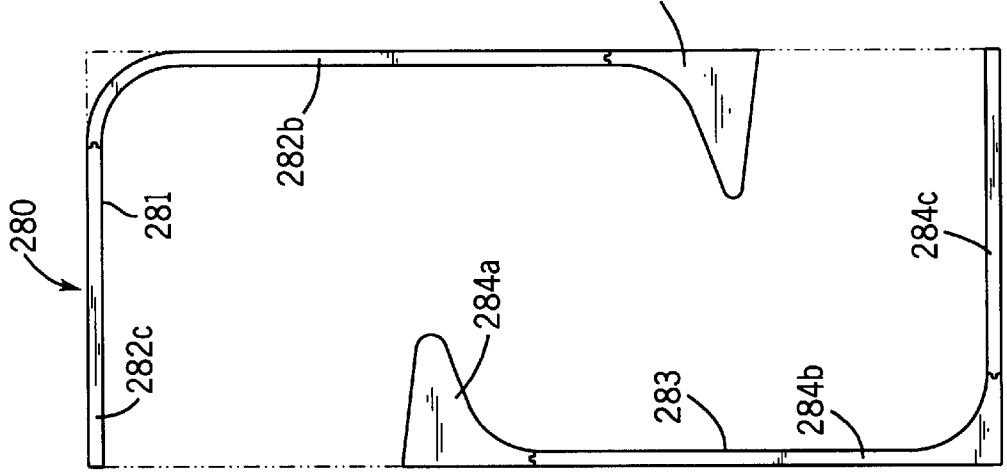
FIG. 14 is a front view of a modular perimeter gasket arrangement for the charge gas plate of FIG. 13.

Referring now to FIG. 14, a perimeter gasket 280 for the charge gas plate 242 of FIG. 13. The perimeter gasket 280 is a modular gasket that fits along the top of perimeter raised contoured ridges 263a and b of FIG. 13. The perimeter gasket seals the outer edge of the charge gas channels such that the charge gas does not travel outside of its intended path along the charge gas plate 242. The perimeter gasket 280 is broken up into two modules 281 and 283, which are each subdivided into interlocking portions 282a–c and 284a–c, respectively. Each of the interlocking portions of the perimeter gasket 280 generally mirror the shape of the perimeter raised contoured ridge upon which they will be applied. The perimeter gasket 280 may be constructed of any resilient material that prevents escape of the charge gas when stacked with the other plates in the heat exchanger. The perimeter gasket is designed to maintain the charge gas in a sinusoidal path.

Figure 15:
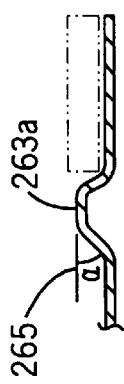
FIG. 15 is a partial sectional view of a perimeter raised contoured ridge of the charge gas plate taken along line 15—15 of FIG. 13.

Referring now to FIG. 15, a cross section of the perimeter raised contoured ridge 263a is shown. The perimeter raised contoured ridge as shown is similar to the perimeter raised contoured ridges of the exhaust gas plate. The perimeter raised contoured ridge 263a has a downwardly slope angle alpha as measured from horizontal line 265. Preferably, the downward slope angle alpha is in a range of 20 to 60 degrees so as to aid in draining condensate from the heat exchanger.

Figure 16:
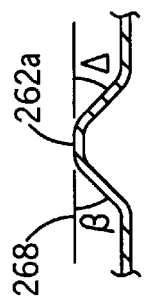
FIG. 16 is a partial sectional view showing a raised contoured ridge of the charge gas plate taken along line 16—16 of FIG. 13.

In FIG. 16, the raised contoured ridge 262a is shown, with multiple downward slope angles beta and delta as measured from horizontal line 268. Again, angles beta and delta are preferably in the range of 20 degrees to 60 degrees so as to aid in draining condensate from the heat exchanger. A similar raised contoured ridge structure is used for the exhaust gas plates of FIG. 17.

For both FIGS. 15 and 16, the raised contoured ridges (including the perimeter raised contoured ridges) have a height substantially in the range of 0.012 to 0.12 inches in a preferred embodiment.

Figure 17:
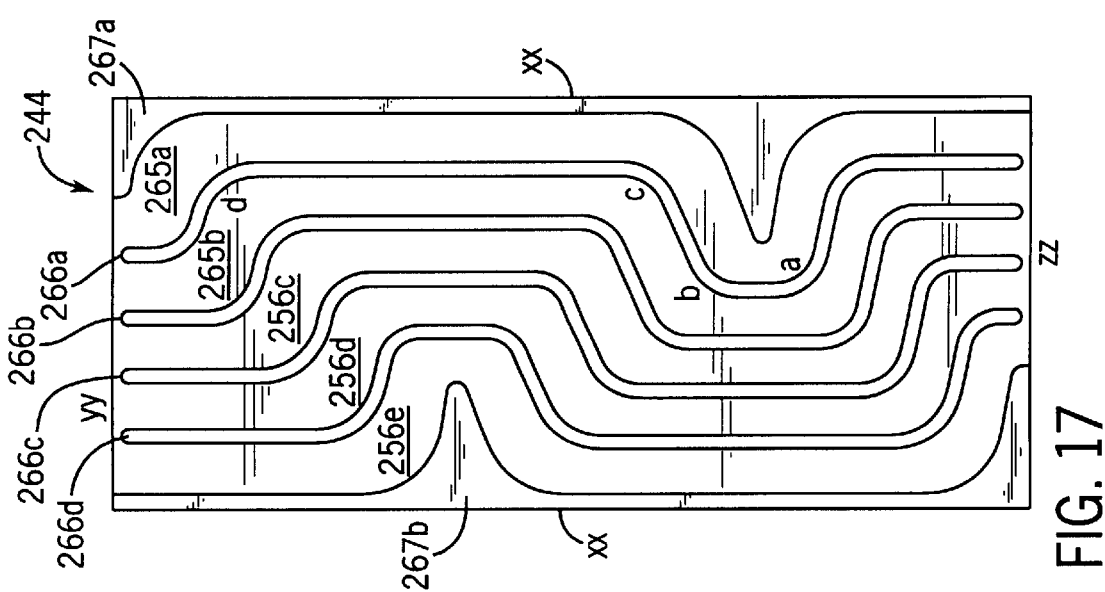
FIG. 17 is a front view of an exhaust gas plate in accordance with the third embodiment of the invention.

Referring now to FIG. 17, an exhaust gas plate 244 of the third embodiment is shown. As in the other embodiments, the exhaust gas plate 244 includes raised contoured ridges or ribs 266a–d, which are substantially parallel to one another and preferably spaced 1.5 to 5 inches apart. The raised contoured ridges 266a–d line-up in a substantially sinusoidal fashion along the exhaust gas plate 244. It is preferred that the raised contoured ridges do not contain any sharp angular regions so as not to create low-flow zones along the contoured sinusoidal path. For example, raised contoured ridge 266a, locations a, b, c and d define a specific radius of curvature. It is preferred that this radius of curvature is a minimum of 1.5 inches. This preferred radius of curvature is similar for the other raised contoured ridges 266b–d. The substantially sinusoidal path, combined with an appropriate radius of curvature, contributes to a reduction in the pressure loss along the exhaust gas plate. Preferably, the raised contoured ridges 266a–d are evenly spaced along the face of the charge plate 244. The raised contoured ridges 266a–d also define multiple exhaust gas channels 256a–e. Likewise, these exhaust gas channels are also substantially sinusoidal. The exhaust gas plate 244 also includes perimeter contoured ridges 267a and b which bound the exhaust gas plate 244.

The exhaust gas plate 244 defines a mid-line along line XX, and the exhaust gas channels 256a–e terminate on generally diagonal opposing ends YY and ZZ with respect to the mid-line XX. The raised contoured ridges 266a–d, including perimeter raised contoured ridges 267a and b provide structural support. The raised contoured ridges 266a–d and perimeter raised contoured ridges 267a and b have a height substantially in the range from 0.012 to 0.12 inches in a preferred embodiment.

Figure 18:
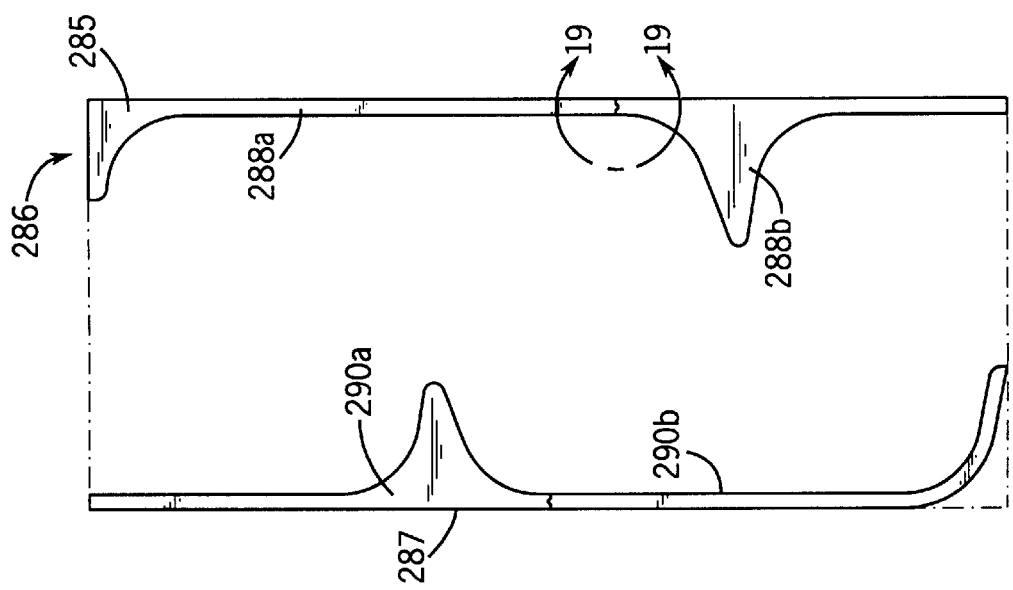
FIG. 18 is a front view of a modular perimeter gasket arrangement for the exhaust gas plate of FIG. 17.

Referring now to FIG. 18, a perimeter gasket for the exhaust gas plate 244 of FIG. 17. The perimeter gasket 286 is a modular gasket that fits along the top of perimeter raised contoured ridges 267a and b of FIG. 17. The perimeter gasket 286 seals the outer edge of the exhaust gas channels such that the exhaust gas does not travel outside of its intended path along the exhaust gas plate 244. The perimeter gasket 286 is broken up into two modules 285 and 287, which are each subdivided into interlocking portions 288a–b and 290a–b, respectively. Each of the interlocking portions generally mirror the shape of the perimeter raised contoured ridge upon which they will be applied. The perimeter gasket 286 may be constructed of any resilient material that prevents escape of the exhaust gas when stacked with the other plates in the heat exchanger. The perimeter gasket is designed to maintain the exhaust gas in a sinusoidal path.

Figure 19:
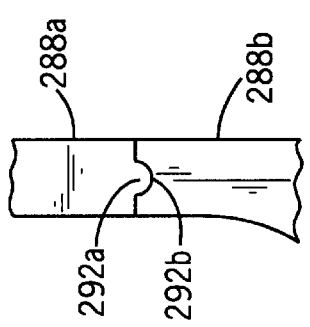
FIG. 19 is a partial enlarged view of the perimeter gasket taken along line 19—19 of FIG. 18.
Figure 20:
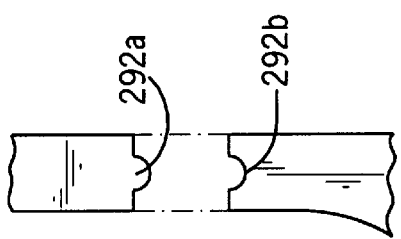
FIG. 20 is a partial sectional view showing the connection of the perimeter gasket of FIG. 19.

Referring now to FIGS. 19 and 20, a closeup of interlocking portions 288a and 288b as shown. The connection between the two portions is an interlocking of male portion 292a and female portion 292b. Other suitable connections are contemplated by the present invention, so long as the integrity of the seal during operation is maintained.

FIGS. 21–24 illustrate experimental data utilizing an exhaust gas heat recuperation system in accordance with the present invention. For FIGS. 21–24:

$T_{gi}$ is the temperature (degrees Fahrenheit) of the exhaust gas coming into the heat exchanger.

$T_{go}$ is the temperature of the exhaust gas coming out of the heat exchanger.

$T_{ai}$ is the temperature of the charge gas coming into the heat exchanger.

$T_{ao}$ is the temperature of the charge gas coming out of the heat exchanger.

$D_p$ gas is the differential pressure of the exhaust gas.

$D_p$ air is the differential pressure of the charge gas.

Figure 21:
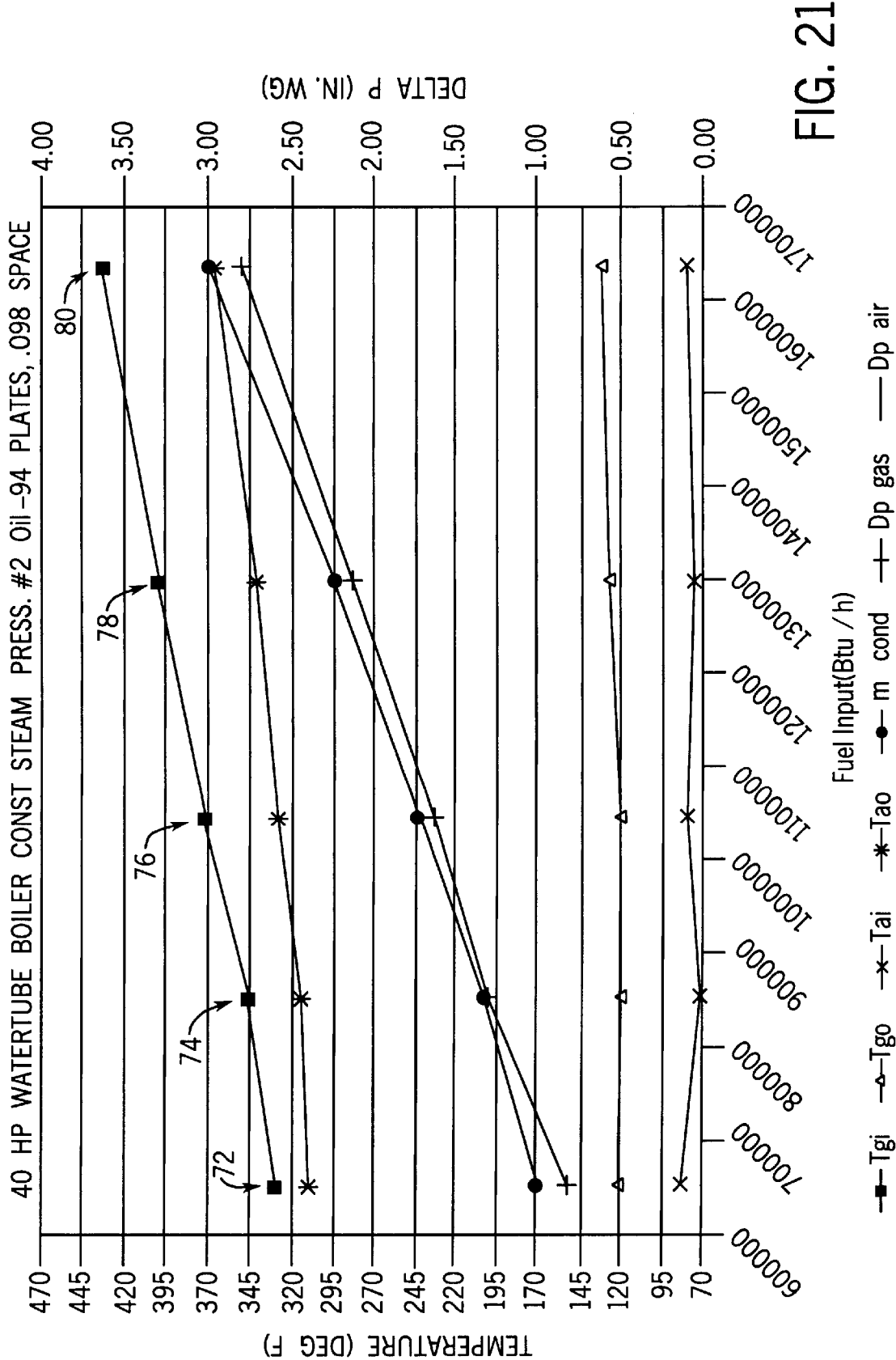
FIG. 21 is a graphical representation of experimental data taken while operating an embodiment of the present invention utilizing oil as a fuel.

Referring now to FIG. 21 a graph of experimental data is shown. The experiment on the present invention was utilized with a 40 Hp Watertube Boiler, operating at constant steam pressure, with No. 2 distillate oil as the fuel. Ninety-four plates were used with a spacing of 0.098 inches between each adjacent plate. Data was taken for the various parameters at 5 operating points 72, 74, 76, 78 and 80 ranging from 600,000 to 1,700,000 BTU/hour fuel input. The graph shows temperature and differential pressure ($D_p$) versus fuel input.

In general, it is desired in an invention of this type to extract the most amount of heat from the exhaust gas into the charge gas, and to minimize $D_p$, the differential pressure between the exhaust gas as it enters and exits the heat exchanger, or the differential pressure between the charge gas as it enters and exits the heat exchanger. High pressure losses result in reduced throughput of the gases. In the present invention, advantageously, the differential pressure indicators $D_p$ gas and $D_p$ air increase as a function of fuel input. Similarly, the temperature of the incoming exhaust gas $T_{gi}$ and the temperature of the charge gas output $T_{ao}$ increase as a function of the fuel input. Even with the increase in the input exhaust (flue) gas temperature $T_{gi}$, the recovered heat as represented by the temperature of the output charge gas $T_{ao}$ also increases, but at a lower rate. Therefore, less of the available heat is extracted from the exhaust gas as it moves from operating regions 72, 74 to the higher operating regions 78, 80. Also, the lowest differential pressures $D_p$ gas and $D_p$ air occur at the lower operating regions 72, 14, with increasing exhaust gas differential pressure and charge gas differential pressure with an increase in fuel input, or higher boiler operation points. Under laminar flow conditions, the charge gas pressure loss and the exhaust gas pressure loss decreases linearly as the fuel input rate of the boiler decreases. By laminar flow, it is meant that the flow has a Reynolds number less than/equal to 2300. The Reynolds number is calculated as:

$$R_e = \frac{(\text{density})(\text{velocity})(\text{mean hydraulic diameter})}{(\text{viscosity})}$$

Figure 22:
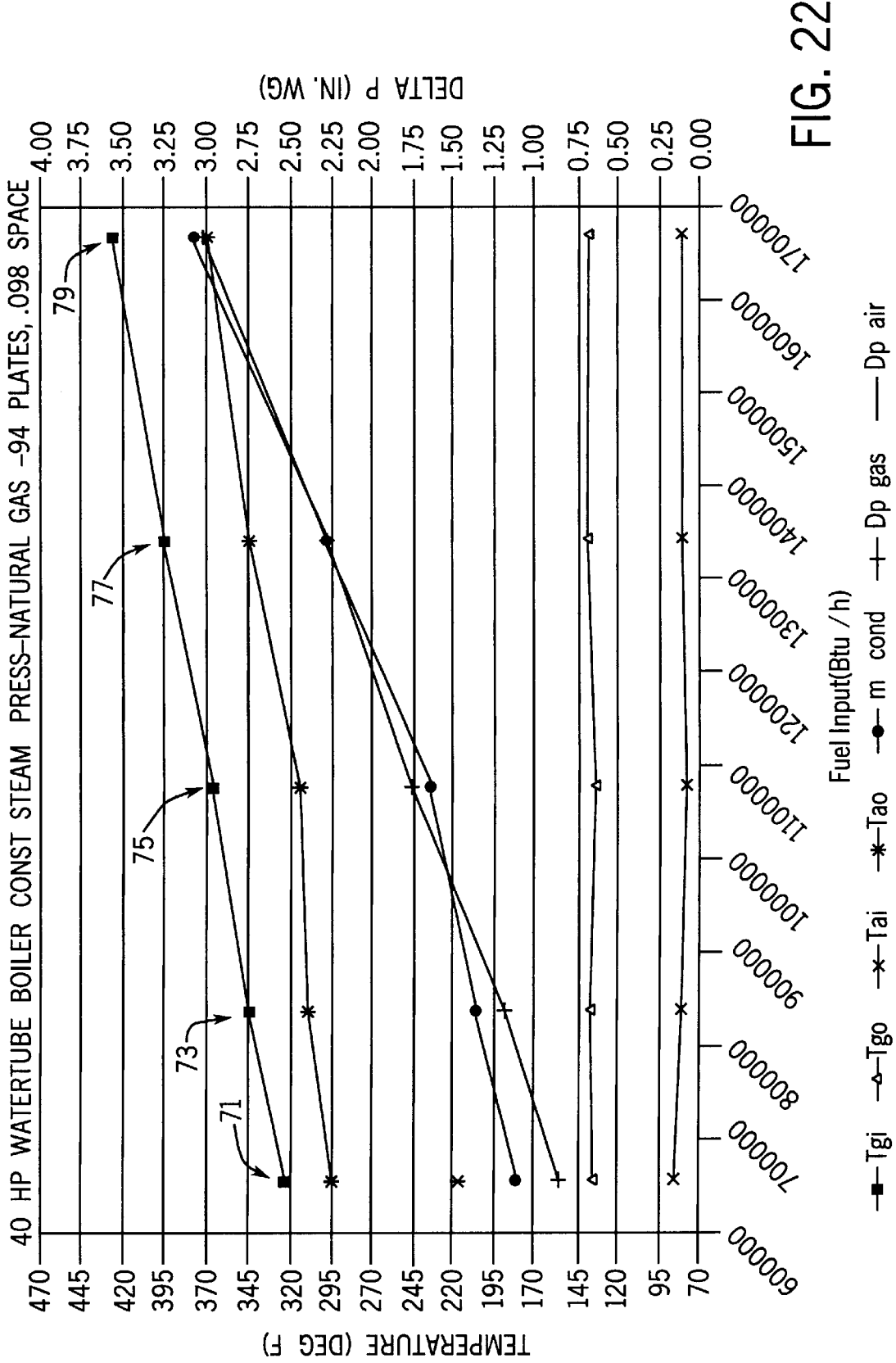
FIG. 22 is a graphical representation of experimental data taken during operation of an embodiment of the present invention utilizing natural gas as a fuel.

Referring now to FIG. 22, similar parameters are identified in a second experiment utilizing the 40 Hp Watertube Boiler, operating at constant steam pressure, with natural gas as the fuel. Again, a heat exchanger incorporating 94 plates with a spacing of 0.098 inches between each plate was used. Data was taken at 5 operating points 71, 73, 75, 77 and 79 again ranging from 600,000 to 1,700,000 BTU/hour as the fuel input. The results for the natural gas fuel mirrored the trends in the illustration of FIG. 12. The greatest heat, as represented by the temperature of the output charge gas $T_{ao}$, is closest to the temperature of the input exhaust gas $T_{gi}$ in the operating regions 71, 73. It is in these regions where the lowest differential pressures for the exhaust gas and the charge gas occur as well.

Referring now to FIG. 23, a table of the data points illustrated in FIG. 12 is shown FIG. 14 includes calculation of $Q_{max}$ or the maximum theoretical heat obtained for the given operating parameters. The actual heat or $Q_{act}$ was also calculated in order to give an efficiency calculation or $E_{ff}$ by taking the actual heat and dividing it into the theoretical maximum heat possible.

$E_{ff}$ was calculated as:

$$E_{ff} = \frac{T_{ao} - T_{ai}}{T_{gi} - T_{ao}}$$

It is important to note that typical efficiencies of heat exchangers of the plate-type variety are approximately 70%. Current experimentation yielded efficiencies ranging from 79.9% through 91.3%. The best efficiencies occurred in the lower range of the boiler operating spectrum. The opposing directions of the charge gas and the exhaust gas result in better heat transfer, particularly at these lower operating points where lower flows allow more time, and therefore more exposure, between the two flowing gases.

Referring now to FIG. 24, the tabular data for the experimental points of FIG. 22 are illustrated. Again, theoretical maximum heat $Q_{max}$ and actual heat $Q_{act}$ were calculated to yield an efficiency calculation Eff. In this experimental data for natural gas, efficiencies of 83.4 through 88.7% were obtained. Better efficiencies occurred again at the lower operating point regions of the boiler operating spectrum.

For both FIGS. 23 and 24, the variables followed by the word "Cal" indicate engineering model projections based upon the operating conditions.

Advantageously, extremely high efficiencies were obtained utilizing embodiments of the present invention.

The present invention has been described in terms of the preferred embodiment, and it is recognized that equivalents, alternatives, and modifications, aside from those expressly stated, are possible and within the scope of the appending claims.

What is claimed is:

1. An exhaust gas heat recuperation system comprising:
   a heat exchanger for exchanging heat from an exhaust gas to a charge gas, the heat exchanger including:
   a plurality of exhaust gas plates, each exhaust gas plate having a plurality of raised contoured ridges forming a substantially sinusoidal path along each exhaust gas plate and defining multiple substantially sinusoidal exhaust gas channels for directing the exlhxaust gas therealong; and
   a plurality of charge gas plates stacked alternately with and parallel to the exhaust gas plates, each charge gas plate having a plurality of raised contoured ridges adjacent to the exhaust gas plates and forming a substantially sinusoidal path along each charge gas plate and defining multiple substantially sinusoidal charge gas channels for directing the charge gas therealong, the exhaust gas plates and the charge gas plates connected together to permit exhaust gas entering the exhaust gas contoured channels to Slow parallel to and in a substantially opposite direction to the charge gas flowing in the charge gas contoured channels to facilitate heat transfer from the exhaust gas to the charge gas;
   an exhaust gas inlet conduit connected to the heat exchanger for conducting the exhaust gas to the heat exchanger,
   an exhaust gas outlet conduit connected to the heat exchanger for conducting the exhaust gas from the heat exchanger;
   a charge gas inlet conduit connected to the heat exchanger for conducting the charge gas to the heat exchanger,
   a charge gas outlet conduit connected to the heat exchanger for conducting the charge gas from the heat exchanger, and
   a boiler connected to the charge gas outlet conduit for receiving the charge gas when the charge gas exits the heat exchanger to assist in boiler combustion.

2. The exhaust gas heat recuperation system of claim 1 wherein the charge gas is drawn from ambient air.

3. The exhaust gas heat recuperation system of claim 1 wherein the boiler has a power rating in a range from 10 to 2000 horsepower.

4. The exhaust gas heat recuperation system of claim 1 wherein the substantially sinusoidal path of the exhaust gas raised contoured ridges does not contain sharp angular sections, thereby reducing exhaust gas particulate deposition in the exhaust gas channels.

5. The exhaust gas heat recuperation system of claim 1 wherein the exhaust gas plates and the charge gas plates are arranged in a vertical orientation.

6. The exhaust gas heat recuperation system of claim 1 wherein each exhaust gas plate is separated from each adjacent charge gas plate by a space substantially in a range of 0.030 to 0.300 inches.

7. The exhaust gas heat recuperation system of claim 1 wherein the exhaust gas and the charge gas flow through the heat exchanger in laminar flow conditions.

8. The exhaust gas heat recuperation system of claim 1 further comprising a condensate collection chamber connected to the beat exchanger for collecting condensation formed as a result of cooling the exhaust gas.

9. The exhaust gas heat recuperation system of claim 1 wherein the heat exchanger operates at an efficiency substantially in the range of 80 to 90%.

10. The exhaust gas heat recuperation system of claim 9 wherein the heat exchanger operating efficiency increases as a fuel input rate of the boiler decreases.

11. The exhaust gas heat recuperation system of claim 10 wherein the heat exchanger charge gas pressure loss and exhaust gas pressure loss decrease linearly as a fuel input rate of the boiler decreases.

12. The exhaust gas heat recuperation system of claim 1 wherein the raised contoured ridges of each of the exhaust gas plates and the charge gas plates are substantially parallel to one another and spaced approximately 1.5 to 5 inches apart from one another.

13. The exhaust gas heat recuperation system of claim 1 wherein the raised contoured ridges of each of the exhaust gas plates and charge gas plates define a radius of curvature in the sinusoidal path and wherein the radius of curvature is a minimum of 1.5 inches.

14. The exhaust gas heat recuperation system of claim 1 wherein the raised contoured ridges of each of the exhaust gas plates and charge gas plates has a downward slope angle, and wherein the downward slope is in a range of 20 degrees to 60 degrees measured from horizontal so as aid in draining condensate from the heat exchanger.

15. The exhaust gas heat recuperation system of claim 1 wherein the raised contoured ridges of each of the exhaust gas plates and charge gas plates provide structural support for their respective plates.

16. The exhaust gas heat recuperation system of claim 1 further including at least one perimeter gasket and wherein the perimeter gasket is secured to the exhaust gas plates and charge gas plates.

17. The exhaust gas heat recuperation system of claim 1 wherein each of the charge gas plates defines a charge gas plate midline and wherein the charge gas channels terminate on generally diagonal opposing ends of the charge gas plate with respect to the midline.

18. The exhaust gas heat recuperation system of claim 1 wherein each of the exhaust gas plates defines an exhaust gas plate midline and wherein the exhaust gas channels terminate on generally diagonal opposing ends of the exhaust gas plate with respect to the midline.

19. The exhaust gas heat recuperation system of claim 1 wherein the raised contoured ridges of each of the exhaust gas plates and charge gas plates have a height substantially in the range from 0.012 to 0.12 inches.

20. An integral boiler and exhaust gas heat recuperation system comprising:

a heat exchanger for exchanging heat from an exhaust gas to a charge gas, the heat exchanger including:
  a plurality of exhaust gas plates, each exhaust gas plate having a plurality of raised contoured ridges forming a substantially sinusoidal path along each exhaust gas plate and defining multiple substantially sinusoidal exhaust gas channels for directing the exhaust gas therealong; and
  a plurality of charge gas plates stacked alternately with and parallel to the exhaust gas plates, each charge gas plate having a plurality of raised contoured ridges adjacent to the exhaust gas plates and forming a substantially sinusoidal path along each charge gas plate and defining multiple substantially sinusoidal charge gas channels for directing the charge gas therealong, the exhaust gas plates and the charge gas plates connected together to permit exhaust gas entering the exhaust gas contoured channels to flow parallel to and in a substantially opposite direction to the charge gas flowing in the charge gas contoured channels to facilitate heat transfer from the exhaust gas to the charge gas;
an exhaust gas inlet conduit connected to the heat exchanger for conducting the exhaust gas to the heat exchanger;
an exhaust gas outlet conduit connected to the heat exchanger for conducting the exhaust gas from the heat exchanger;
a charge gas inlet conduit connected to the heat exchanger for conducting the charge gas to the heat exchanger;
a charge gas outlet conduit connected to the heat exchanger for conducting the charge gas from the heat exchanger;
a boiler connected to the charge gas outlet conduit for receiving the charge gas when the charge gas exits the beat exchanger,
a condensate collection chamber connected to the heat exchanger for collecting condensation formed as a result of cooling the exhaust gas; and
wherein the heat exchanger is connected directly to the boiler to form an integral unit.

21. The exhaust gas heat recuperation system of claim 20 wherein the charge gas is drawn from ambient air.

22. The exhaust gas heat recuperation system of claim 20 wherein the boiler has a power rating in a range from 10 to 2000 horsepower.

23. The exhaust gas heat recuperation system of claim 20 wherein the substantially sinusoidal path of the exhaust gas raised contoured ridges does not contain sharp angular sections, thereby reducing exhaust gas particulate deposition in the exhaust gas channels.

24. The exhaust gas heat recuperation system of claim 20 wherein. the exhaust gas plates and the charge gas plates are arranged in a vertical orientation.

25. The exhaust gas heat recuperation system of claim 20 wherein each exhaust gas plate is separated from each adjacent charge gas plate by a space substantially in the range of 0.030 to 0.300 inches.

26. The exhaust gas heat recuperation system of claim 20 wherein the exhaust gas and the charge gas flow through the heat exchanger in laminar flow conditions.

27. The exhaust gas heat recuperation system of claim 20 further including a pair of base beams and a plurality of support members between the base beams and the boiler housing.

28. The exhaust gas heat recuperation system of claim 20 wherein the heat exchanger operates at an efficiency substantially in the range of 80 to 90%.

29. The exhaust gas heat recuperation system of claim 28 wherein the heat exchanger operating efficiency increases as a fuel input rate of the boiler decreases.

30. The exhaust gas heat recuperation system of claim 29 wherein the heat exchanger charge gas pressure loss and exhaust gas pressure loss decrease linearly as a fuel input rate of the boiler decreases.

* * * * *

UNITED STATES PATENT AND TRADEMARK OFFICE
CERTIFICATE OF CORRECTION

PATENT NO.    : 6,470,835 B1
DATED         : October 29, 2002
INVENTOR(S)   : Tod A. Stansfield et al.

It is certified that error appears in the above-identified patent and that said Letters Patent is hereby corrected as shown below:

Title page,
Item [56], References Cited, U.S. PATENT DOCUMENTS add:
-- 6,059,025    05/2000 Hossfeld      165/166
   5,829,513   11/1998 Urch          65/54
   5,785,117   07/1998 Grinbergs     165/166
   5,522,696   06/1996 Stansfield    415/151
   5,490,559   02/1996 Dinulescu     165/148
   5,392,849   02/1995 Matsunaga     165/167
   5,383,516   01/1995 Dinulescu     165/82
   5,295,473   03/1994 Neufeldt      126/103
   5,078,208   01/1992 Urch          165/166
   4,596,285   06/1986 Dinulescu     165/82
   4,475,589   10/1984 Mizuno        165/166
   4,442,886   04/1984 Dinulescu     165/76
   4,308,915   01/1982 Sanders       165/166
   4,141,412   02/1979 Culbertson    165/166
   3,155,565   11/1964 Goodman       159/13
   2,960,160   11/1960 Goodman       159/13 --

Column 3,
Line 62, replace "beat" with -- heat --.
Line 66, replace "beaters" with -- heaters --.

Column 8,
Line 43, replace "exhaust. gas" with -- exhaust gas --.

Column 11,
Line 23, replace "14" with -- 74 --.
Line 51, replace "shown FIG. 14" with -- shown. FIG. 14 --.

Column 12,
Line 8, replace "Eff" with -- $^{E}$ff --.
Line 30, replace "exlhxaust" with -- exhaust --.
Line 41, replace "Slow" with -- flow --.

UNITED STATES PATENT AND TRADEMARK OFFICE
CERTIFICATE OF CORRECTION

PATENT NO.   : 6,470,835 B1
DATED        : October 29, 2002
INVENTOR(S)  : Tod A. Stansfield et al.

It is certified that error appears in the above-identified patent and that said Letters Patent is hereby corrected as shown below:

Column 14,
Line 35, replace "beat" with -- heat --.
Line 52, replace "wherein. the" with -- wherein the --.

Signed and Sealed this

Twenty-second Day of July, 2003

JAMES E. ROGAN
*Director of the United States Patent and Trademark Office*